(12) United States Patent
Schumann et al.

(10) Patent No.: US 12,195,082 B2
(45) Date of Patent: Jan. 14, 2025

(54) METHOD OF USING BRAKES TO STEER A VEHICLE

(71) Applicants: Continental Automotive Systems, Inc., Auburn Hills, MI (US); Steering Solutions IP Holding Corporation, Auburn Hills, MI (US)

(72) Inventors: Clinton L. Schumann, Holly, MI (US); Scott T. Sanford, Swartz Creek, MI (US); Michael S. Wyciechowski, Grand Blanc, MI (US); Todd Bowman, Grand Blanc, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 223 days.

(21) Appl. No.: 17/069,044

(22) Filed: Oct. 13, 2020

(65) Prior Publication Data
US 2022/0111895 A1 Apr. 14, 2022

(51) Int. Cl.
*B62D 15/02* (2006.01)
*B60W 30/18* (2012.01)
*B60W 40/114* (2012.01)

(52) U.S. Cl.
CPC ..... *B62D 15/025* (2013.01); *B60W 30/18109* (2013.01); *B60W 40/114* (2013.01); *B60W 2510/18* (2013.01); *B60W 2520/14* (2013.01)

(58) Field of Classification Search
None
See application file for complete search history.

(56) References Cited

U.S. PATENT DOCUMENTS

| | | | |
|---|---|---|---|
| 10,046,749 B2 | 8/2018 | Jonasson et al. | |
| 11,052,889 B2* | 7/2021 | Wulf | B60W 10/10 |
| 2006/0015231 A1* | 1/2006 | Yoshimura | B60T 7/12 |
| | | | 701/48 |
| 2009/0051216 A1* | 2/2009 | Maeda | B60W 30/02 |
| | | | 303/146 |
| 2011/0231052 A1* | 9/2011 | Ellis | B60T 8/246 |
| | | | 701/31.4 |

(Continued)

*Primary Examiner* — Ig T An
(74) *Attorney, Agent, or Firm* — Lorenz & Kopf LLP (57) ABSTRACT

A number of variations may include a method including using at least one of brakes or propulsion energy to steer an autonomous or semi-autonomous vehicle if a primary, secondary or other redundant steering system for an autonomous or semi-autonomous vehicle has failed or is insufficiently unhealthy to perform a desired function, the method including determining if a primary, secondary or other redundant steering system of an autonomous or semi-autonomous vehicle has failed or is not sufficiently healthy to perform a desired function, and if so, converting a steer request into a desired yaw rate, curvature, curvature over time, radius, radius or time or yaw rate acceleration, calculating a brake pressure sufficient to produce the desired yaw rate, curvature, curvature over time, radius, radius or time or yaw rate acceleration, delivering brake pressures signals via a lateral control module to an actuator for at least one brake connected to a wheel of the vehicle so that the brake pressure causes the vehicle yaw at the desired yaw rate, curvature, curvature over time, radius, radius or time or yaw rate acceleration.

21 Claims, 5 Drawing Sheets

(56) References Cited

U.S. PATENT DOCUMENTS

| | | | | |
|---|---|---|---|---|
| 2012/0271483 | A1* | 10/2012 | Samukawa | B60W 10/184 |
| | | | | 701/1 |
| 2012/0283907 | A1* | 11/2012 | Lee | B60T 8/17557 |
| | | | | 701/31.9 |
| 2013/0253793 | A1* | 9/2013 | Lee | B60W 50/029 |
| | | | | 701/70 |
| 2016/0090100 | A1* | 3/2016 | Oyama | B62D 15/025 |
| | | | | 701/23 |
| 2016/0132055 | A1* | 5/2016 | Matsuno | B60W 10/184 |
| | | | | 701/23 |
| 2016/0325721 | A1* | 11/2016 | Jonasson | B60T 8/171 |
| 2016/0368534 | A1* | 12/2016 | Harda | B62D 15/025 |
| 2017/0166210 | A1* | 6/2017 | Kim | B60W 30/18118 |
| 2018/0009470 | A1* | 1/2018 | Meyer | B60W 10/04 |
| 2019/0113913 | A1* | 4/2019 | Ryne | B60W 50/12 |
| 2019/0361449 | A1* | 11/2019 | Ueno | B60W 50/029 |
| 2020/0207410 | A1* | 7/2020 | Yamamoto | G05D 1/0223 |
| 2020/0317192 | A1* | 10/2020 | Awane | B60W 50/0225 |
| 2021/0009162 | A1* | 1/2021 | Hecker | B62D 5/09 |
| 2021/0107455 | A1* | 4/2021 | Naito | B60W 10/18 |
| 2021/0139050 | A1* | 5/2021 | Fujita | B60W 60/00186 |
| 2021/0181760 | A1* | 6/2021 | Lee | B60W 10/20 |
| 2021/0188252 | A1* | 6/2021 | Lu | B60W 10/22 |
| 2021/0213935 | A1* | 7/2021 | Lu | B60W 10/22 |

* cited by examiner

METHOD OF USING BRAKES TO STEER A VEHICLE

TECHNICAL FIELD

This disclosure relates to methods of using at least one of brakes, wheel motor speed or propulsion energy to steer a vehicle.

BACKGROUND

Brakes have been used to assist in steer a vehicle, such as a tractor.

SUMMARY

A number of variation may include a method including using at least one of a brake pressure, wheel motor speed or propulsion energy to steer an autonomous or semi-autonomous vehicle if a primary, secondary or other redundant steering system of the autonomous or semi-autonomous vehicle has failed or is insufficiently unhealthy to perform a desired function, the method including determining if a primary, secondary or other redundant steering system of an autonomous or semi-autonomous vehicle has failed or is not sufficiently healthy to perform a desired function, and if so, converting a steer request into a desired yaw rate, curvature, curvature over time, radius, radius or time or yaw rate acceleration, calculating at least one of a brake pressure or propulsion energy sufficient to produce the desired yaw rate, curvature, curvature over time, radius, radius or time or yaw rate acceleration, delivering at least one of a brake pressure, wheel motor or propulsion energy signals via a lateral control module to the individual calipers of at least one brake on a wheel of the vehicle, a wheel motor or a propulsion system so that the at least one of a brake pressure, wheel motor speed or propulsion energy yaw the vehicle to the desired yaw rate, curvature, curvature over time, radius, radius or time or yaw rate acceleration.

A number of variation may include a method including using at least one of a brake pressure, wheel motor speed or propulsion energy to steer an autonomous or semi-autonomous vehicle if a primary, secondary, or other redundant steering system fails or is unable to perform a requested function, the method comprising;
(a) continuously monitoring vehicle travel data and vehicle path,
(b) determining if a primary or redundant steering system has failed or not capable of performing a requested function,
(c) if the primary or redundant steering system has not failed and is capable of performing a requested function, repeat steps (a) and (b),
(d) if a primary or redundant steering system has failed or is not capable of forming a requested function, then determining a desired yaw rate, curvature, curvature over time, radius, radius or time or yaw rate acceleration from a requested steering angle by a driver or virtual driver,
(e) determining at least one of a brake pressure or propulsion energy for at least one brake of a vehicle or engine to achieve a desired yaw rate, curvature, curvature over time, radius, radius or time or yaw rate acceleration,
(f) sending a signal from a lateral control module to a brake actuator of the at least one brake connected to a wheel of the vehicle to apply, wheel motor or a propulsion system the determined at least one of a brake pressure, wheel moto speed or propulsion energy to yaw the vehicle at the desired yaw rate, curvature, curvature over time, radius, radius or time or yaw rate acceleration,
(g) if at least one of the applied brake pressure, wheel motor speed, or propulsion energy did not yaw the vehicle as desired then requesting a new steering angle, and repeating steps (e), (f), and (g),
(h) otherwise, if at least one of the applied brake pressure, wheel motor speed or propulsion energy did yaw vehicle to the desired position, stop steps (d), (e), (f), (g), and (h).

A number of variations may include a method including using wheel motor speed to steer a vehicle if a primary, secondary, or other redundant steering system fails or is unable to perform a requested function, the method comprising;
(a) continuously monitoring vehicle travel data and vehicle path,
(b) determining if a primary or redundant steering system has failed or not capable of performing a requested function,
(c) if the primary or redundant steering system has not failed and is capable of performing a requested function, repeat steps (a) and (b),
(d) if a primary or redundant steering system has failed or is not capable of forming a requested function, then determining a desired yaw rate curvature, curvature over time, radius, radius or time or yaw rate acceleration, from a requested steering angle by a driver or virtual driver,
(e) determining relative wheel speed for at least one wheel of a vehicle to achieve a desired yaw rate, curvature, curvature over time, radius, radius or time or yaw rate acceleration,
(f) sending a signal from an electronic wheel motor control system to a motor connected to the at least one wheel of the vehicle to achieve the determined relative wheel speed to yaw the vehicle,
(g) if the wheel speed of the at least one wheel did not yaw the vehicle as desired then requesting a new steering angle, and repeating steps (e), (f), and (g),
(h) otherwise, if the wheel speed of the at least one wheel did yaw vehicle to the desired position, stop steps (d), (e), (f), (g), and (h).

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

As a backup to traditional steering system, brakes and/or propulsion energy can be used to "steer" a vehicle. In other words, if the normal steering system were to fail, a brake system could supply different brake pressures at different wheels and/or propulsion energy, such as but not limited to engine torque and "steer" the vehicle. A number of variations may include a method including convert a steering request into a needed brake pressure or propulsion energy to yaw the vehicle. This is unique in that the driver or virtual driver would not have to change the native way it is communicating the vehicle's desired lateral control. In a number of variations, the brake to steer feature may calculate and broadcast its capability to "steer" the vehicle. The driver or virtual driver may then look ahead and adjust accordingly. The driver or virtual driver may make path adjustments such as continuing the current path, or pulling over, or stopping in place. A path planner may also continue to regulate the vehicle's throttle and braking to maintain speed if desired. Propulsion energy may be provided to keep the vehicle from coming to a stop while brakes pressure is applied. Also, propulsion energy can be controlled to provide braking in addition to brake calipers or brake motors by way of driveline differential effects as engine torque flows through the driveline.

Using the brakes and/or propulsion energy to steer the vehicle, adds another redundancy concept for a steering system. Redundant concepts increase the safety of the vehicle, as they are backups to a system. In this case, if the steering system were to fail or not be capable of performing a desired function, the brake to steer feature could provide a way to "steer" the vehicle and help position the vehicle to a safer place. Otherwise, the vehicle would have to just stop if the steering system were non-functional. In a number of variations, the driver or virtual driver may continue to use the native methods (and calculations) to communicate the vehicle's desired lateral control. In a number of variations, the method including the brake to steer feature may communicate its capability to "steer" the vehicle to various components, controls and/or the driver or virtual driver. This would be beneficial if a path adjustment is needed.

In a number of variations, the brake to steer feature may function by converting a steer request into a desired yaw rate curvature, curvature over time, radius, radius or time or yaw rate acceleration, which is then converted into at least one of appropriate brake pressures or propulsion energy to yaw the vehicle at the desired yaw rate, curvature, curvature over time, radius, radius or time or yaw rate acceleration. At least one of brake pressure or propulsion energy signals may then be delivered via a lateral control module or an electronic brake system to the individual calipers sets of each brake. The brake calipers, brake motors, or propulsion system with the supplied brake pressure and/or wheel movement would then yaw the vehicle appropriately. Then based on the vehicle's yaw rate, curvature, curvature over time, radius, radius or time or yaw rate acceleration, the vehicle's driver or virtual driver may make corrections, similar to a driver driving with a normal steering system. After the driver or virtual driver makes corrections, the process starts over. The driver or virtual driver would also regulate the throttle and the requested brake torque/deceleration requests. The conversions from the requested steering to yaw rate, curvature, curvature over time, radius, radius or time or yaw rate acceleration, and the conversion from yaw rate curvature, curvature over time, radius, radius or time or yaw rate acceleration, to brake pressure and/or propulsion energy may be accomplished via calculations or look up tables. Converting steering angle straight to the at least one of appropriate brake pressures or propulsion energy could also be done with calculations or look up tables, however, first converting to a desired yaw rate, curvature, curvature over time, radius, radius or time or yaw rate acceleration, is easier to conceptualize. Allowing the driver or virtual driver to continue to communicate its desired lateral response via the normal steering request permits the driver or virtual driver to use its normal calculations and eliminates the need for special communication methods. In a number of variations, the steering request by be provided by rotating a steering wheel, moving a joy or control stick, by hand gestures, or other methods of controlling the direction that the vehicle moves. The driver or virtual driver calculations maybe influenced by the brake to steer capability also being broadcasted/communicated to other components, controls, and/or the driver.

The brake to steer feature may also involve monitoring the vehicle's speed, and yaw rate, curvature, curvature over time, radius, radius or time or yaw rate acceleration, and lateral acceleration . . . such it would be calculating and sending out the capability if the brake to steer feature was suddenly enabled. A path planner may have the upcoming information including upcoming curves whereby if the brake to steer feature would become enabled, it could compare the brake to steer capability to the upcoming curves and adjust the path. The path could be adjusted such as re-mapping a path, or pull over, or stop in place.

Brake to steer could be used as a backup for most steering systems. However, the general thought is that most in-production steering systems (power assisted rack and pinion style) are very well studied and their failure modes are understood. These systems are robust, with few failures, and the driver is able to remain in control of the vehicle during most failures. While the brake to steer concept could be of benefit during a failure in these connected systems, based on the failure, the feature could also startle a driver as the brake forces and torques would be transferred through the steering column and felt in the steering wheel. The brake to steer system could be especially useful in autonomous vehicles where the steering wheel is removed. In this case, the driver would not be able to assist in steering the vehicle during failed steering scenarios. Another scenario where the brake to steer feature could be especially useful is for steer-by-wire applications. In these systems, the driver would also not be able assist in steering the vehicle as the mechanical connection to the road wheels would be eliminated. The capability to "steer" the vehicle could be also be used in the steer-by-wire system and limit the steering wheels movement to the capability of the brake to steer feature.

Figure 1:
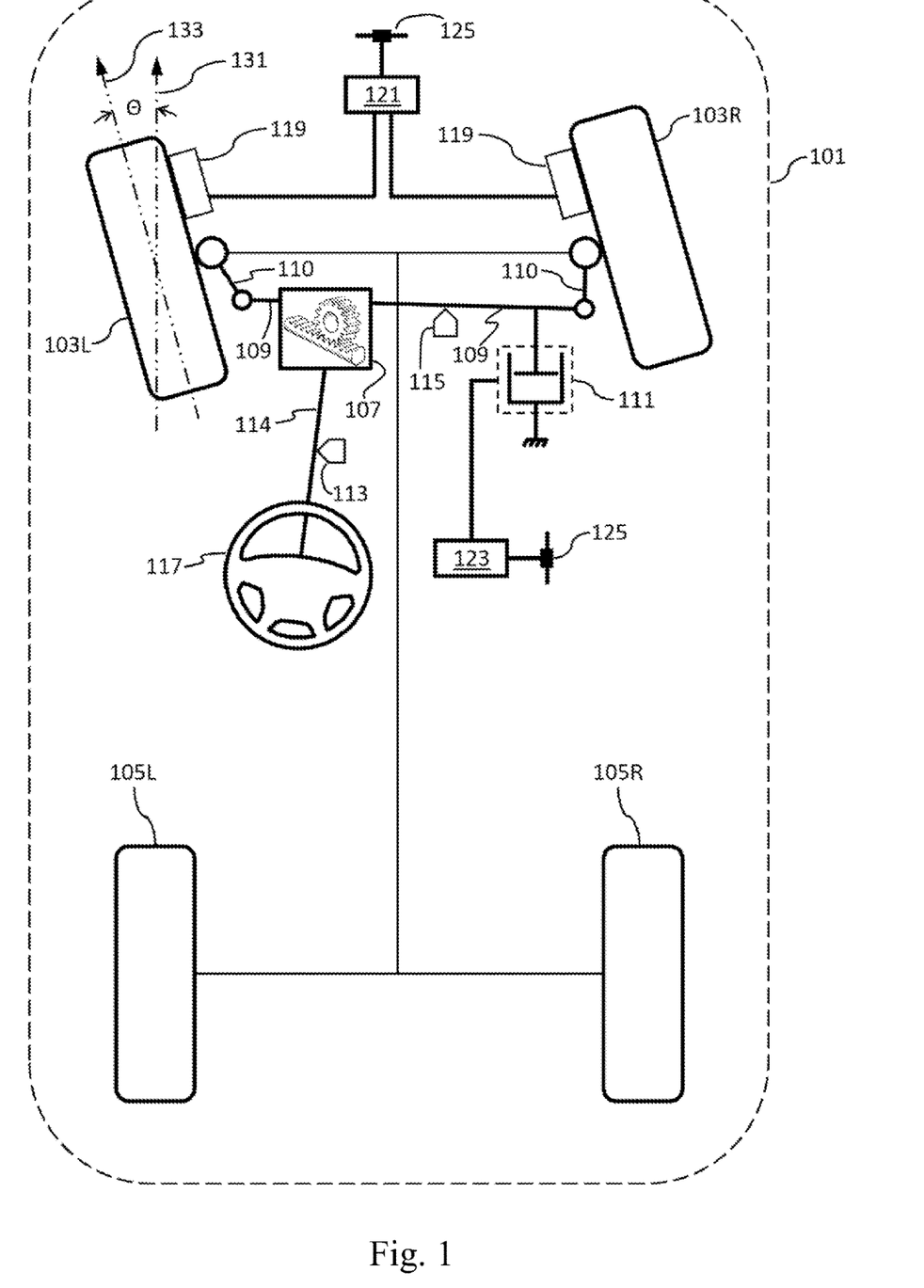
FIG. 1 illustrates a vehicle according to a number of illustrative variations.
Figure 6:
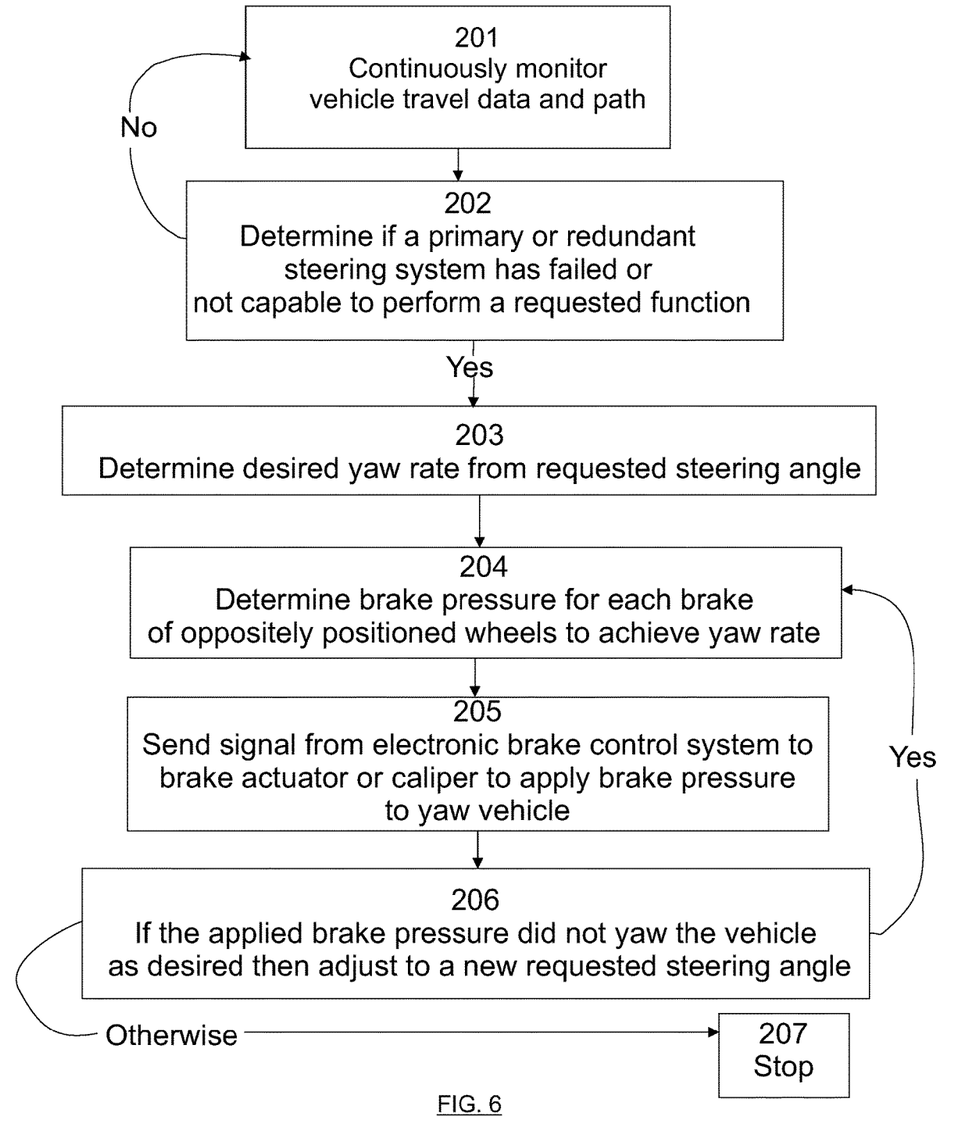
FIG. 6 illustrates a method of using braking to steer a vehicle according to a number of variation.
Figure 7:
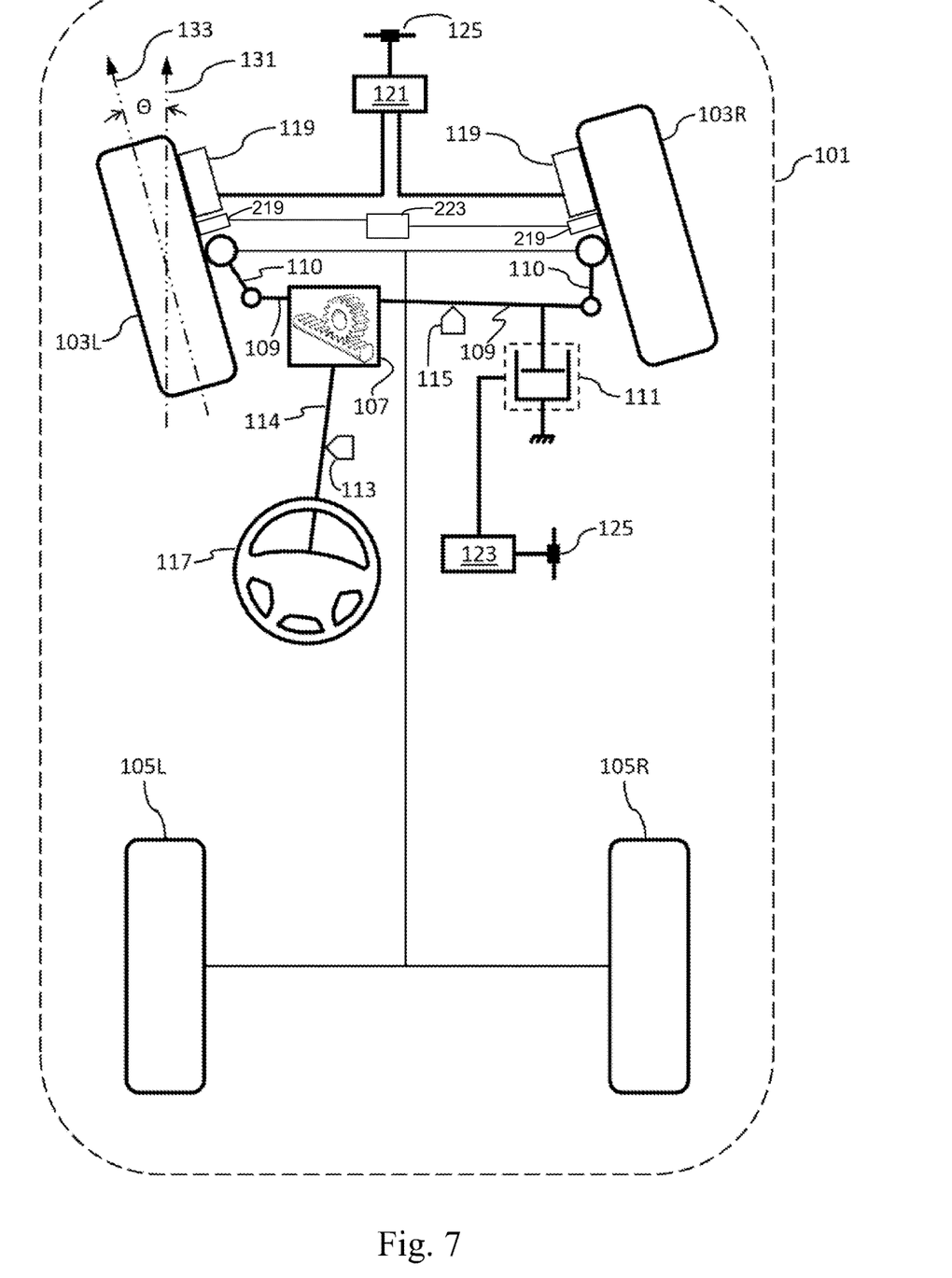
FIG. 7 illustrates a vehicle according to a number of illustrative variations.

Referring now to the drawings, wherein the showings are for the purpose of illustrating certain variations only and not for the purpose of limiting the same, FIGS. 1 and 7 schematically illustrates a vehicle 101 according to a number of variation, which may include a front side-to-side pairing of wheels and a rear side-to-side pairing of wheels. Though some or all of the wheels may be mounted on independent spindles or axles, each such pairing of wheels may be referred to as an axle set. The front axle set may include left and right front wheels 103L, 103R respectively, and the rear axle set may include left and right rear wheels 105L, 105R respectively. Other multi-wheeled vehicles within the scope of the claimed subject matter may include combinations more or fewer wheels and additional axle sets. The vehicle may be propelled by a powertrain system (not illustrated) which applies drive torque to at least one of the wheels. Vehicle braking may be affected by a braking system preferably including an individually controllable friction brake at each wheel. Such braking systems may include multi-channel hydraulic circuits each of which may be individually actuated to control hydraulic brake pressure and hence brake apply to the respective wheel independent of the other wheels. Other braking system are known including electric machine torque application such as in motor at wheel electric drives. In this regard, in addition to or as an alternative to the brakes 119, reference numeral 219 may be a motor that can be used to adjust the relative rotation of a wheel compared to other wheels of the vehicle in order to steer the vehicle if a primary or redundant steer system fails or is not capable of performing a requested function. The motor 219 may be controlled by the lateral control module or an electron wheel motor controller 213 (FIG. 6). At least one such brake 119 or motor 219 may be associated with at least one of the steered wheels. In FIG. 1, independently actuatable brakes 119 are shown associated with each front wheel 103L, 103R. Brake control module (BCM) 121 may provide the braking functions including hydraulic brake pressure application, control and diagnostic functions. BCM 121 may participate in a controller area network (CAN) as illustrated via bus 125 of such a CAN including sending and receiving data, requests and commands among other networked control modules. Any other known methods including, but not limited to, pneumatic, electric, or magnetic application of brake pressure may be utilized.

Directional steering in vehicle 101 may be provided by the front wheels which are steered wheels with the rear wheels 105L, 105R merely trailing. Alternatively, wheels other than the front wheels may also be steered and such arrangements also fall within the scope of the claimed subject matter. The steering system in the vehicle 101 may include a rack and pinion gear set 107. The rack gear may be coupled at opposite ends to steering linkage such as tie rods 109 and steering arms 110, for example, to transfer the linear motion of the rack to change the steering angle of the steered wheels 103L, 103R. A pinion gear at one end of a steering shaft 114 may mesh with the rack gear such that rotary motion of a steering wheel 117 at the opposite end of the steering shaft 114 translates the rack gear to change the steering angle of the steered wheels 130L, 103R. Alternative steering mechanisms may be employed including steering gearboxes and appropriate linkages. Additionally, steering systems may employ electric or hydraulic assist. And, "by-wire" steering systems are known which mechanically decouple the steering wheel or alternate operator interface from the steering mechanism. All such alternative steering systems' features and combinations fall within the scope of the claimed subject matter. One or more steering angle position sensors 113, 115 may be employed for detecting and deriving feedback and control parameters such as rotation displacement, rotation direction, rotational velocity and acceleration, desired steering angle, actual steering angle, etc. For example, sensor 113 is shown on one side of the rack and pinion set 107 to sense rotary displacement of the coupled steering shaft 114 and steering wheel 115, whereas sensor 115 is shown on the opposite side of the rack and pinion set 107 to sense linear displacement of the coupled rack and tie rods 109. When the steering wheel 117 or alternative operator interface is mechanically coupled to the steering linkages then sensor 113 may be sufficient for detecting and deriving feedback and control parameters. However, when there is no such direct mechanical connection, sensor 115 may be required for detecting and deriving steering system parameters such as actual steering angle. Sensors may couple directly to control modules or may interface with the CAN via a node. Lateral control module (LCM) 123 may provide vehicle stability control functions based upon steering angle, yaw, wheel speed etc. such as but not limited to developing wheel braking and powertrain torque commands to be carried out by the BCM and a powertrain control module (PCM), and Steering control unit (SCU) functions including, for example, by-wire steering control responsive to operator input and to carry out autonomous and semi-autonomous functions such as but not limited to lane keeping and vehicle platooning. The LCM 123 may house logic for steering the vehicle laterally via any available means in a situation wherein braking to steer may be necessary. The LCM 123 may be used along with or communicate with any modules to perform any number of the functions of the LCM 123 as necessary, which may include but are not limited to the functions of Electronic Stability Control (ESC) modules, the functions of SCU modules, the functions of BCMs, the functions of PCMs, the functions Traction Control Systems (TCS), or the functions of any other known vehicle system or module that may provide any form of control regarding vehicle movement such as but not limited to control of vehicle yaw control, vehicle roadwheel speed, anti-lock brake function, emergency brake, traction control. Certain driving situations may arise in which LCM 123 may need to communicate with numerous modules controlling both lateral and longitudinal movement in order for the LCM 123 to perform an LCM 123 function. For example, a situation may arise in which any number of steering components or modules have fully or partially failed in highway traffic, and the vehicle's longitudinal travel needs to be controlled for safety reasons while the vehicle systems or sensors scan for an opportunity for the vehicle to hobble to the side of the road by braking to steer according to at least one of the methods described herein. Moreover, upon a detected steering failure—and to prevent the driver from causing a crash—throttling may disabled by the LCM 123 via the PCM and a slight straightforward brake may be applied by the LCM 123 via the BCM while the LCM 123 may communicate with sensors on the right side of the vehicle to find an opening in traffic into which the vehicle may be steered via braking by the LCM 123, according to at least one of the methods described herein, until the vehicle is safely stopped on the right shoulder of the road. It is also contemplated that a similar situation may arise in which acceleration instead of braking is desirable. In such a case, the LCM 123 may similarly work with other vehicle modules or systems to produce the desired acceleration. In accordance with this disclosure, LCM functions may include developing wheel braking commands and damping steering movement of steered wheels to affect steering based upon the brake force, wheel to road dynamics, chassis design, and vehicle speed, among other factors. Damper 111 is shown mechanically operatively coupled to the steering linkage and controllably operatively coupled to LCM 123. Damper 111 may take any suitable form effective to impede or, attenuate or lock motion of the steering motion of a steered wheel. For example, damper 111 may be a hydraulic damper with a controllable orifice. Damper 111 may be incorporated within a hydraulic assist circuit as a variable orifice. Damper 111 may be implemented as a friction device such as a band clutch, brake, wet or dry slipping clutch, etc. Damper 111 may be a selectively engaged Sprague clutch, overrun clutch, ratchet or similar. Damper 111 may be a variable resistance magnetic screw. Damper 111 may be a magnetorheological fluid damper. LCM 123 may participate in the controller area network (CAN) as illustrated via bus 125 including sending and receiving data, requests and commands among other networked control modules.

Control module means any one or various combinations of one or more of Application Specific Integrated Circuit(s) (ASIC), electronic circuit(s), central processing unit(s) and associated memory and storage (read only, programmable read only, random access, hard drive, etc.) that may execute one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module may have a set of control routines executed to provide the desired functions. Routines may be executed, such as by a central processing unit, and may be operable to monitor inputs from sensing devices and other networked control modules and may execute control and diagnostic routines to control operation of actuators. Routines may be executed at regular intervals during ongoing engine and vehicle operation. Alternatively, routines may be executed in response to occurrence of an event or upon operator input.

Figure 2:
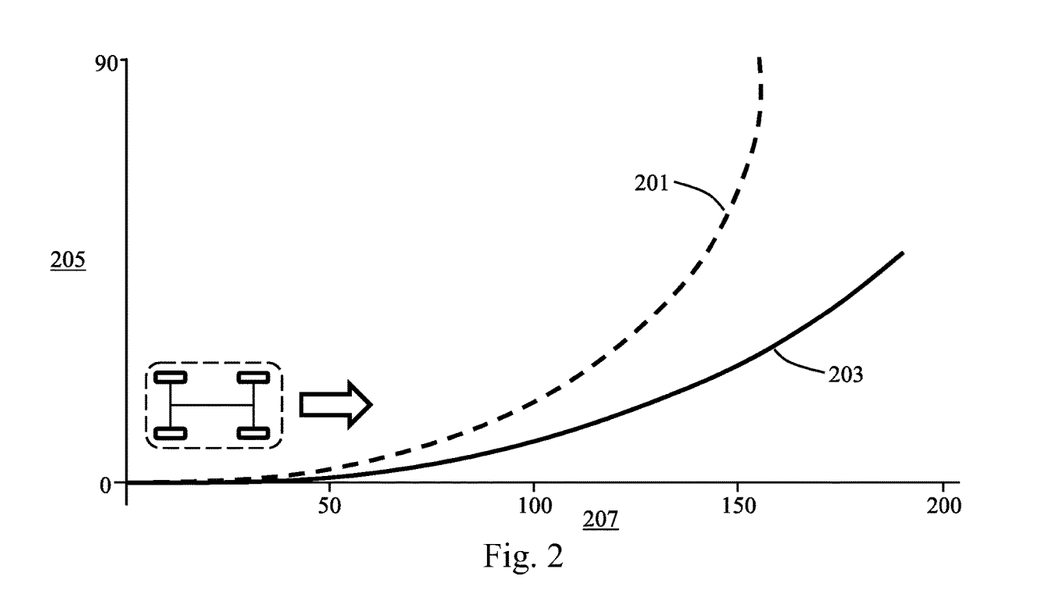
FIG. 2 illustrates various lateral vehicle displacements according to a number of illustrative variations.
Figure 3:
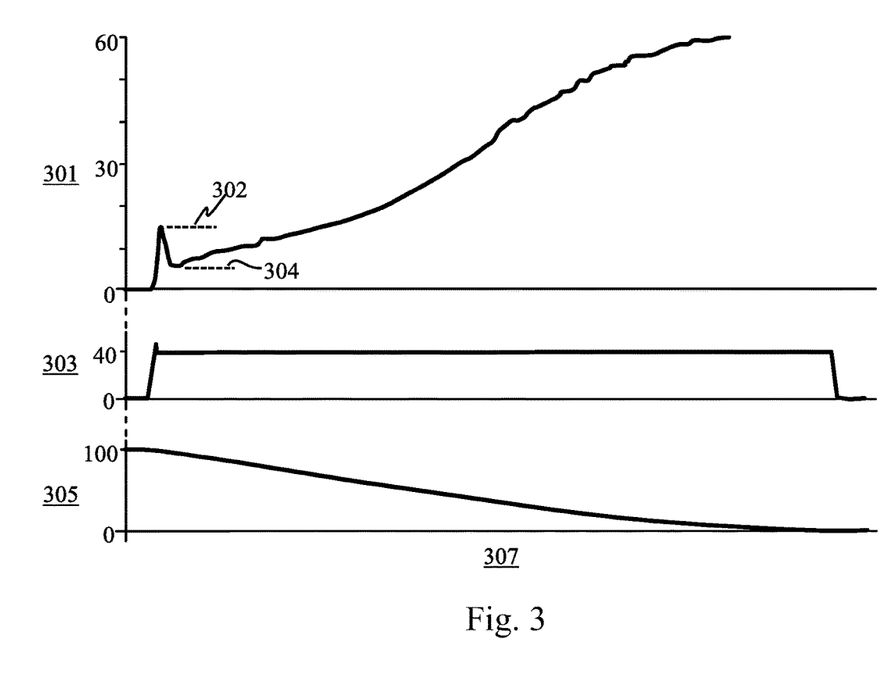
FIG. 3 illustrates steering angle, brake pressure and vehicle speed corresponding to FIG. 2, and according to a number of illustrative variations.

FIG. 2 illustrates the efficacy of the vehicle wheel steer control system and method in accordance with the disclosure wherein braking is applied to a left front wheel of a vehicle. FIG. 2 graphically shows on the horizontal axis 207 longitudinal vehicle displacement in meters and on the vertical axis 205 lateral vehicle displacement in meters with the intersection being the origin of the graph. FIG. 3 graphically shows on the horizontal axis 307 longitudinal vehicle displacement in meters corresponding to the same displacements along the horizontal axis 207 of FIG. 2. Vertical axis 305 represents vehicle speed in kph, vertical axis 303 represents hydraulic brake pressure in bar, and vertical axis 301 represents steered wheel angle in degrees. As used herein, steered wheel angle, steering angle and steering wheel angle are equivalent terms. With reference to FIG. 1, steering angle Θ represents the angle that the centerline of the wheel 133 makes with the vehicle longitudinal axis 131. Steering angles that open to the left in the figure are designated positive (+) and steering angles opening to the right in the figure are designated negative (−). Again, with reference to FIG. 2, at the origin, each curve 201, 203 represents initial vehicle speed of substantially 100 kph and a steering angle Θ of substantially zero. Curve 203 represents a baseline displacement response of the vehicle during application of the left front wheel brake wherein the steering angle Θ is maintained at substantially zero degrees. Such vehicle redirection may be referred to a brake steer and is the result of differences in braking between wheels on opposite sides of the vehicle or differences in braking among the four corners of the vehicle. Unchecked, such brake steer may be undesirable; however, such principles are controllably employed in advanced vehicle stability controls and in brake steering systems employed primarily in heavy equipment applications for improved low speed cornering performance. Curve 201 represents a displacement response of the vehicle during application of the left front wheel brake wherein the steering angle Θ is permitted to increase from zero unchecked. Brake application at the steered wheel results in a steering moment upon the steered wheel related to the brake force, wheel to road dynamics, chassis design, and vehicle speed, among other factors. In particular, brake force at a steered wheel will impart a moment upon the steered wheel whose direction and magnitude are related to the scrub radius, scrub direction, and brake force. In this illustrative variation, positive scrub radius will result in a moment upon the steered wheel to open the steering angle away from the vehicle centerline whereas a negative scrub radius will result in a moment upon the steered wheel to open the steering angle toward the vehicle centerline. In this illustrative variation, the vehicle includes a positive scrub radius of substantially +50 mm with a resultant increasing steering angle to the outside of the vehicle. Since the steered wheel in in this illustrative variation is the left front, the vehicle is steered left. If instead the right front steered wheel is braked and has a positive scrub radius, then the resultant increasing steering angle is also to the outside of the vehicle and the vehicle may be steered right. Negative scrub radius at the steered wheels may result in increasing steering angle to the inside of the vehicle. In such configuration, if the steered wheel is the left front, the vehicle may be steered right. And, if the steered wheel is the right front, the vehicle may be steered left. The lateral displacement differences between curves 203 and 201 are due to the progression of the steering angle affected by the continuous brake force application at the left front wheel.

With reference to FIG. 3, and more particularly to the top chart showing steered wheel angle along vertical axis 301, applicants have observed the steered wheel angle may reach an early local maximum 302 followed by a reduction to a local minimum 304 in steering angle and subsequent increase in steering angle all in accordance with a steady state brake pressure (i.e. 40 bar). This initial steering angle retreat may be a result of alignment torques from, for example, tire pneumatics, contact patch deformations, caster effects and steering axis inclination effects among others. Such response characteristics may be tolerable where steering control in accordance with the disclosure is less aggressive; however, such response may become increasingly objectionable in more aggressive steering control is desired and the dynamic range of such anomaly may increase. Therefore, damper 111 may be employed to prevent reverse motion of the steered wheel when the desired steering angle is attained or when continued procession of the steering angle is desired.

Figure 4:
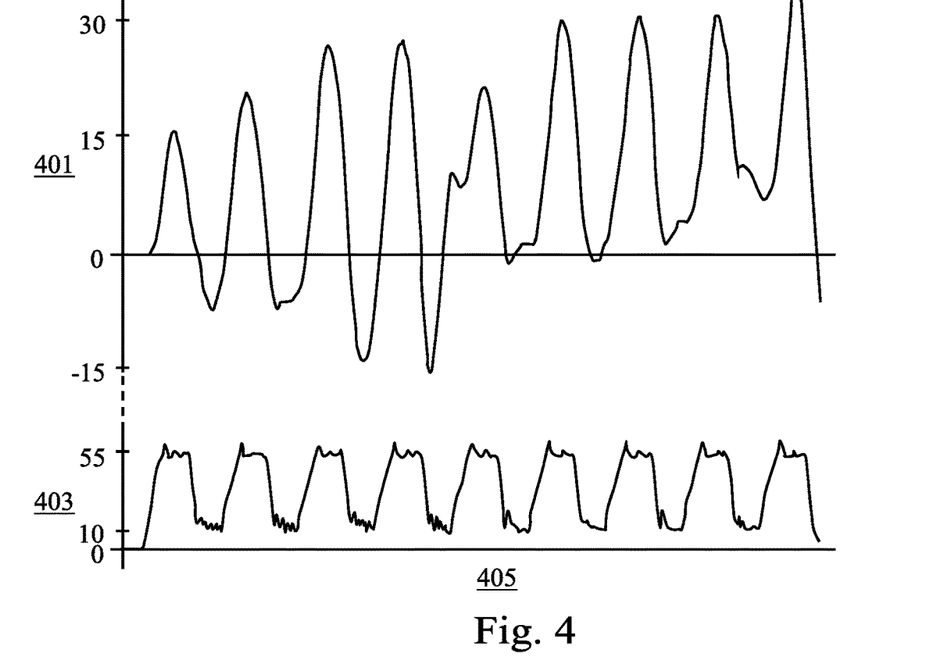
FIG. 4 illustrates steering angle response and corresponding brake application pressure according to a number of illustrative variations.

Applicants recognize that modulating or pulsing brake pressure may be desirable for a number of reasons including, for example, reducing energy consumption and control granularity. With reference to FIG. 4, the alignment torque effects are displayed as more acute at least in certain operating realms. Vertical axis 401 represents steering angle in degrees and vertical axis 403 represents brake pressure in bar, both against the horizontal axis of vehicle displacement or time. Whereas continuous brake pressure application as shown in FIG. 3 may tend to attenuate the early retreat of steering angle, the pulsed brake pressure shown in FIG. 4 may provide unchecked retreat of the steering angle when brake pressure is released and in fact may allow steering angle reversals, oscillations, and large dynamic range within such behaviors. The steering angles in FIG. 4 may vary between about 30 degrees and −15 degrees. The brake pressure in FIG. 4 may vary between about 55 bar and 10 bar.

Figure 5:
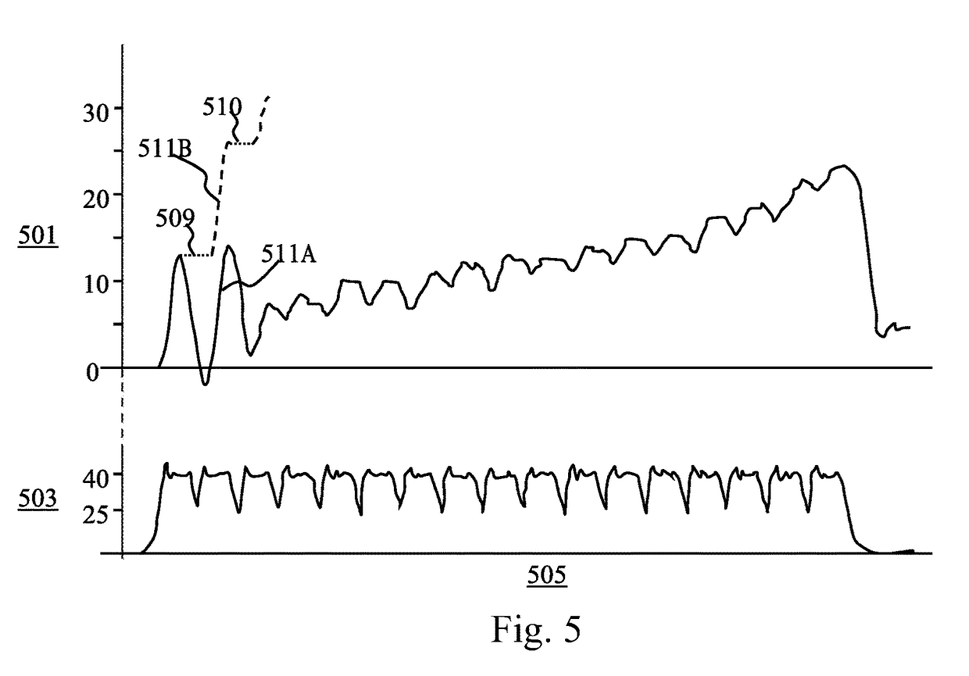
FIG. 5 illustrates steering angle controls and corresponding brake application pressure according to a number of illustrative variations.

Applicants recognize that reducing dynamic range or peak-to-peak variation in pulsed brake pressure and the absolute minimum brake pressure may greatly reduce oscillation tendency in the resultant steering angle response, eliminate steering angle reversals, and smooth the trend in increasing the steering angle. Referring to FIG. 5, vertical axis 501 represents steering angle in degrees and vertical axis 503 represents brake pressure in bar, both against the horizontal axis of vehicle displacement or time. The brake pressure pulses illustrated in FIG. 5 may exhibit a dynamic range of only about one-third of that of the brake pressure pulses illustrated in FIG. 4. Moreover, the steady state maximum pressure pulse may also be less at substantially 40 bar and the steady state minimum pressure pulse may also be greater at substantially 25 bar. Applicants believe the higher minimum pressure pulses are often effective to check large steered wheel movements back toward zero steering angle. From FIG. 5, the steering angle oscillations are seen to be substantially attenuated and a clear trending of increasing steering angles is apparent. Combining the feature of damping steering movement of the steered wheel back toward the zero steering angle with pulse pressure control of the brake at the steered wheel also is illustrated in FIG. 5. Damping or resisting such movement may allow the steering angle to be effectively held in place when the alignment torque is greater than the wheel steering torque resulting from the brake apply such as when brake pressure is reduced. For example, steering angle first reaches a local peak 509 where after, if unchecked, the steering angle may retreat. However, this steering angle reversal is prevented with applied damping and the steering angle remains at the level 509 until the wheel steering torque resulting from the brake application once again exceeds the alignment torque. At this point the incremental change in steering angle may begin from the held steering angle 509 following trajectory 511B substantially corresponding to the corresponding steering angle trajectory 511A where the steering angle was allowed to retreat. Steering angle reversal may again be prevented with applied damping such that the steering angle may remain at the level 510 until the wheel steering torque resulting from the brake apply once again exceeds the alignment torque. Such incremental movements of the steered wheel and steering angle may be repeated as required until a desired steering angle is ultimately attained.

Applicants recognize that each steered wheel of an axle set of steered wheels may, when braked, exhibit wheel steering torque opposite the other. Thus, simultaneous brake apply at such an axle pair of steered wheels may result in a net brake-steer force of substantially zero. However, it may be desirable during a vehicle wheel steer event as has been set forth in this disclosure that total vehicle braking be more substantial than achievable by leaving one of a pair of steered wheels unbraked. Therefore, a differential braking scheme may be employed wherein the wheel that is desirable steered by wheel steering torque experiences a greater brake pressure than the other steered wheel and a net brake-steering force operates upon the desirably steered wheel and total vehicle braking is enhanced by more complete brake system utilization.

In a number of illustrative variations, the method and system for steering a vehicle using braking provides an improved redundancy of the vehicle's steering system. Should the primary steering system fail or become compromised, the redundant steering system using braking can be implemented to finish steering the vehicle to its destination of to simply steer the vehicle to the side of the road. The method and system for steering a vehicle using braking may be advantageous in autonomous or semi-autonomous driving vehicles. The improved redundancy for steering by braking eliminates the need for a secondary steering system substantially similar to the primary steering system, for example, using a motor to drive the steering shaft or rack and pinion system or other system. Alternatively, the steering by braking may be implemented as a tertiary steering system.

A number of variations may include a method including using brakes to steer a vehicle if a primary, secondary or other redundant steering system for an autonomous or semi-autonomous vehicle has failed or is insufficiently unhealthy to perform a desired function, the method including determining if a primary, secondary or other redundant steering system for an autonomous or semi-autonomous vehicle has failed or is not sufficiently healthy to perform a desired function, and if so, converting a steer request into a desired yaw rate, curvature, curvature over time, radius, radius or time or yaw rate acceleration, calculation at least one of a brake pressure or propulsion energy sufficient to produce the yaw rate, curvature, curvature over time, radius, radius or time or yaw rate acceleration, delivering at least one of brake pressures or propulsion energy signals via an electronic brake system to the individual calipers for brakes connected to wheels of the vehicle so that at least one of the calipers/brake pressure, wheel motor, or propulsion energy then yaw the vehicle to the desired yaw rate, curvature, curvature over time, radius, radius or time or yaw rate acceleration.

FIG. 6 illustrates a flowchart of at least one variation of a method including using brakes to steer a vehicle if a primary, secondary, or other redundant steering system fails or is unable to perform a requested function. The method may include the step 201 of continuously monitoring vehicle travel data and vehicle path, and step 202 of determining if a primary or redundant steering system has failed or not capable of performing a requested function. If the primary or redundant steering system has not failed and is capable of performing a requested function, the steps 201 and 202 are repeated. But if a primary or redundant steering system has failed or is not capable of forming a requested function, then step 203 includes determining a desired yaw rate, curvature, curvature over time, radius, radius or time or yaw rate acceleration, from a requested steering angle by a driver or virtual driver. In step 204, the method includes determining brake pressure for each brake of a vehicle to achieve a desired yacht rate. In step 205, a signal is sent from electronic brake control system to a brake actuator or caliper to apply the determined brake pressure to yaw the vehicle. In step 206, if the applied brake pressure did not yaw the vehicle as desired then the driver or virtual driver adjusts to provide a new requested steering angle, and steps 203, 204, 205, and 206, are repeated. Otherwise, if the applied brake pressure did yaw vehicle to the desired position, steps 203, 204, 205, 206 of the method are stopped at step 207.

The disclosure has described certain illustrative variations and modifications thereto. Further modifications and alterations may occur to others upon reading and understanding the specification. Therefore, it is intended that the disclosure not be limited to the particular illustrative variations disclosed as the best mode contemplated for carrying out this disclosure, but that the disclosure will include all illustrative variations falling within the scope of the appended claims.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the claimed subject matter.

Variation 1 may include a method including using at least one of brakes, wheel motor or propulsion energy to steer an autonomous or semi-autonomous vehicle if a primary, secondary or other redundant steering system of the autonomous or semi-autonomous vehicle has failed or is insufficiently unhealthy to perform a desired function, the method including determining if a primary, secondary or other redundant steering system of an autonomous or semi-autonomous vehicle has failed or is not sufficiently healthy to perform a desired function, and if so, converting a steer request into a desired yaw rate, curvature, curvature over time, radius, radius or time or yaw rate acceleration, calculating a at least one of brake pressure, wheel motor speed, or propulsion energy sufficient to produce the desired yaw rate, curvature, curvature over time, radius, radius or time or yaw rate acceleration, delivering at least one of brake pressures, wheel motor speed, or propulsion energy signals via a lateral control module to the individual calipers of at least one brake on a wheel of the vehicle, the wheel motor, or propulsion system so that the calipers, wheel motor speed, or propulsion energy yaw the vehicle to the desired yaw rate, curvature, curvature over time, radius, radius or time or yaw rate acceleration.

Variation 2 may include a method as set forth in Variation 1 further comprising continuously communicating the state of health of at least one of an electronic braking system, wheel motor, or propulsion system to other controllers of the vehicle.

Variation 3 may include a method including using at least one of brakes, wheel motor or propulsion energy to steer an autonomous or semi-autonomous vehicle if a primary, secondary, or other redundant steering system fails or is unable to perform a requested function, the method comprising;
(a) continuously monitoring vehicle travel data and vehicle path,
(b) determining if a primary or redundant steering system has failed or not capable of performing a requested function,
(c) if the primary or redundant steering system has not failed and is capable of performing a requested function, repeat steps (a) and (b),
(d) if a primary or redundant steering system has failed or is not capable of forming a requested function, then determining a desired yaw rate, curvature, curvature over time, radius, radius or time or yaw rate acceleration, from a requested steering angle by a driver or virtual driver,
(e) determining brake pressure for at least one brake of a vehicle, wheel motor speed or propulsion energy to achieve a desired yaw rate, curvature, curvature over time, radius, radius or time or yaw rate acceleration,
(f) sending a signal from a lateral control module to a brake actuator of the at least one brake connected to a wheel of the vehicle to apply the determined brake pressure, wheel motor or propulsion system to yaw the vehicle at the desired yaw rate, curvature, curvature over time, radius, radius or time or yaw rate acceleration,
(g) if the applied brake pressure, wheel motor speed or propulsion energy did not yaw the vehicle as desired then requesting a new steering angle, and repeating steps (e), (f), and (g),
(h) otherwise, if the applied brake pressure did yaw vehicle to the desired position, stop steps (d), (e), (f), (g), and (h).

Variation 4 may include a method as set forth in Variation 3 further comprising continuously communicating the state of health of at least one of an electronic braking system, wheel motor, or propulsion system to other controllers of the vehicle.

Variation 5 may include a method including using wheel motor speed to steer a vehicle if a primary, secondary, or other redundant steering system fails or is unable to perform a requested function, the method comprising;
(a) continuously monitoring vehicle travel data and vehicle path,
(b) determining if a primary or redundant steering system has failed or not capable of performing a requested function,
(c) if the primary or redundant steering system has not failed and is capable of performing a requested function, repeat steps (a) and (b),
(d) if a primary or redundant steering system has failed or is not capable of forming a requested function, then determining a desired yaw rate curvature, curvature over time, radius, radius or time or yaw rate acceleration, from a requested steering angle by a driver or virtual driver,
(e) determining relative wheel speed for at least one wheel of a vehicle to achieve a desired yaw rate, curvature, curvature over time, radius, radius or time or yaw rate acceleration,
(f) sending a signal from an electronic wheel motor control system to a motor connected to the at least one wheel of the vehicle to achieve the determined relative wheel speed to yaw the vehicle,
(g) if the wheel speed of the at least one wheel did not yaw the vehicle as desired then requesting a new steering angle, and repeating steps (e), (f), and (g),
(h) otherwise, if the wheel speed of the at least one wheel did yaw vehicle to the desired position, stop steps (d), (e), (f), (g), and (h).

Variation 6 may include a method as set forth in Variation 5 further comprising continuously communicating the state of health of the electronic wheel motor control system to other controllers of the vehicle.

While the disclosure has been described in connection with certain variation, it is to be understood that the disclosure is not to be limited to the disclosed variations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for controlling a vehicle, the method comprising:
   determining a capability of a steer-by-brake function of the vehicle;
   determining that the capability of the steer-by-brake function is insufficient to steer the vehicle along a path to be traveled by the vehicle; and
   controlling the vehicle based on a result of determining that the capability of the steer-by-brake function is insufficient to steer the vehicle along a path to be traveled by the vehicle.

2. The method of claim 1, wherein the path to be traveled by the vehicle comprises a curve to be traveled by the vehicle.

3. The method of claim 2, wherein controlling the vehicle comprises controlling the vehicle to stop the vehicle based on the result of determining that the capability of the steer-by-brake function is insufficient to steer the vehicle along a path to be traveled by the vehicle.

4. The method of claim 2, wherein controlling the vehicle comprises controlling the vehicle to pull over on a roadside based on the result of determining that the capability of the steer-by-brake function is insufficient to steer the vehicle along a path to be traveled by the vehicle.

5. The method of claim 2, wherein controlling the vehicle comprises controlling the vehicle to travel along the curve.

6. The method of claim 5, wherein controlling the vehicle to travel along the curve comprises:
   determining a brake pressure to be applied to a wheel of the vehicle to control the vehicle to travel along the curve; and
   controlling a propulsion of the vehicle and the brake pressure to be applied to the wheel of the vehicle to control the vehicle to travel along the curve.

7. The method of claim 2, wherein determining the capability of the steer-by-brake function of the vehicle comprises determining the capability of the steer-by-brake function of the vehicle based on at least one of a speed of the vehicle, a yaw rate of the vehicle, a yaw rate acceleration of the vehicle, and a lateral acceleration of the vehicle.

8. A system for vehicle steering control, the system comprising:
   a processor; and
   a memory including instructions that, when executed by the processor, cause the processor to:
   determine a capability of a steer-by-brake function of the vehicle;
   determine that the capability of the steer-by-brake function is insufficient to steer the vehicle along a path to be traveled by the vehicle; and
   control the vehicle based on a result of determining that the capability of the steer-by-brake function is insufficient to steer the vehicle along a path to be traveled by the vehicle.

9. The system of claim 8, wherein the path to be traveled by the vehicle comprises a curve to be traveled by the vehicle.

10. The system of claim 9, wherein the instructions that, when executed by the processor, cause the processor to control the vehicle to stop the vehicle based on the result of determining that the capability of the steer-by-brake function is insufficient to steer the vehicle along a path to be traveled by the vehicle.

11. The system of claim 9, wherein the instructions that, when executed by the processor, cause the processor to control the vehicle to pull over on a roadside based on the result of determining that the capability of the steer-by-brake function is insufficient to steer the vehicle along a path to be traveled by the vehicle.

12. The system of claim 9, wherein the instructions that, when executed by the processor, cause the processor to control the vehicle to travel along the curve.

13. The system of claim 12, wherein the instructions that, when executed by the processor, cause the processor to:
   determine a brake pressure to be applied to a wheel of the vehicle to control the vehicle to travel along the curve; and
   control a propulsion of the vehicle and the brake pressure to be applied to the wheel of the vehicle to control the vehicle to travel along the curve.

14. The system of claim 9, wherein the instructions that, when executed by the processor, cause the processor to determine the capability of the steer-by-brake function of the vehicle based on at least one of a speed of the vehicle, a yaw rate of the vehicle, a yaw rate acceleration of the vehicle, and a lateral acceleration of the vehicle.

15. A non-transitory computer-readable recording medium having embodied thereon computer-readable instructions which, when executed by a processor, cause the processor to perform a method for controlling a vehicle, the method comprising:
   determining a capability of a steer-by-brake function of the vehicle;
   determining that the capability of the steer-by-brake function is insufficient to steer the vehicle along a path to be traveled by the vehicle; and
   controlling the vehicle based on a result of determining that the capability of the steer-by-brake function is insufficient to steer the vehicle along a path to be traveled by the vehicle.

16. The non-transitory computer-readable recording medium of claim 15, wherein the path to be traveled by the vehicle comprises a curve to be traveled by the vehicle.

17. The non-transitory computer-readable recording medium of claim 16, wherein controlling the vehicle comprises controlling the vehicle to stop the vehicle based on the result of determining that the capability of the steer-by-brake function is insufficient to steer the vehicle along a path to be traveled by the vehicle.

18. The non-transitory computer-readable recording medium of claim 16, wherein controlling the vehicle comprises controlling the vehicle to pull over on a roadside based on the result of determining that the capability of the steer-by-brake function is insufficient to steer the vehicle along a path to be traveled by the vehicle.

19. The non-transitory computer-readable recording medium of claim 16, wherein controlling the vehicle comprises controlling the vehicle to travel along the curve.

20. The non-transitory computer-readable recording medium of claim 19, wherein controlling the vehicle to travel along the curve comprises:
   determining a brake pressure to be applied to a wheel of the vehicle to control the vehicle to travel along the curve; and
   controlling a propulsion of the vehicle and the brake pressure to be applied to the wheel of the vehicle to control the vehicle to travel along the curve.

21. The non-transitory computer-readable recording medium of claim 16, wherein determining the capability of the steer-by-brake function of the vehicle comprises determining the capability of the steer-by-brake function of the vehicle based on at least one of a speed of the vehicle, a yaw rate of the vehicle, a yaw rate acceleration of the vehicle, and a lateral acceleration of the vehicle.

* * * * *